United States Patent [19]

Smith

[11] 4,387,903
[45] Jun. 14, 1983

[54] ANNULAR SEAL

[75] Inventor: Roger R. Smith, Lapeer, Mich.

[73] Assignee: The United States of America as represented by the Secretary of the Army, Washington, D.C.

[21] Appl. No.: 251,610

[22] Filed: Apr. 6, 1981

[51] Int. Cl.³ .................... F16J 15/32; B23Q 17/00
[52] U.S. Cl. .................... 277/212 FB; 285/47; 285/138; 285/224; 285/225
[58] Field of Search .............. 285/138, 224, 225, 47; 277/205

[56] References Cited

U.S. PATENT DOCUMENTS

| | | | |
|---|---|---|---|
| 1,982,252 | 11/1934 | Heggem | 285/225 |
| 3,246,917 | 4/1966 | Martin | 285/225 |
| 3,786,170 | 1/1974 | Floessel | 285/224 |
| 3,928,903 | 12/1975 | Richardson et al. | 285/138 |
| 4,295,653 | 10/1981 | Coles | 277/212 FR |
| 4,304,416 | 12/1981 | Oshima | 277/212 FB |
| 4,332,401 | 6/1982 | Stephenson et al. | 285/47 |

Primary Examiner—Robert I. Smith
Attorney, Agent, or Firm—Peter A. Taucher; John E. McRae; Robert P. Gibson

[57] ABSTRACT

A seal assembly for an annular joint, comprising an outer ring, an inner ring and an intervening membrane. The entire assembly is screwed into place as a one-step operation. Threads on the rings have the same pitch to preclude or minimize excessive axial advancement of one ring relative to the other ring during the seal installation operation.

1 Claim, 2 Drawing Figures

4,387,903

ANNULAR SEAL

GOVERNMENT INTEREST

The invention described herein may be manufactured, used, and licensed by or for the Government for governmental purposes without payment to me of any royalty thereon.

SUMMARY OF THE INVENTION

This invention relates to means for sealing an annular joint between an outer cylindrical member and an inner cylindrical member. The sealing means is designed to use a minimum number of component parts, while permitting considerable play or motion between the inner and outer members. A feature of the sealing means is that is can be installed between the inner and outer members without removing or disturbing other components. Another advantageous feature is that the sealing means can be installed or removed quickly in a single-step operation. Considerable radial misalignment or play can be tolerated between the inner and outer cylindrical members without harming the seal or interferring with the seal installation-removal process. In its installed position the seal takes up a relatively small space in the axial direction.

THE DRAWINGS

Figure 1:
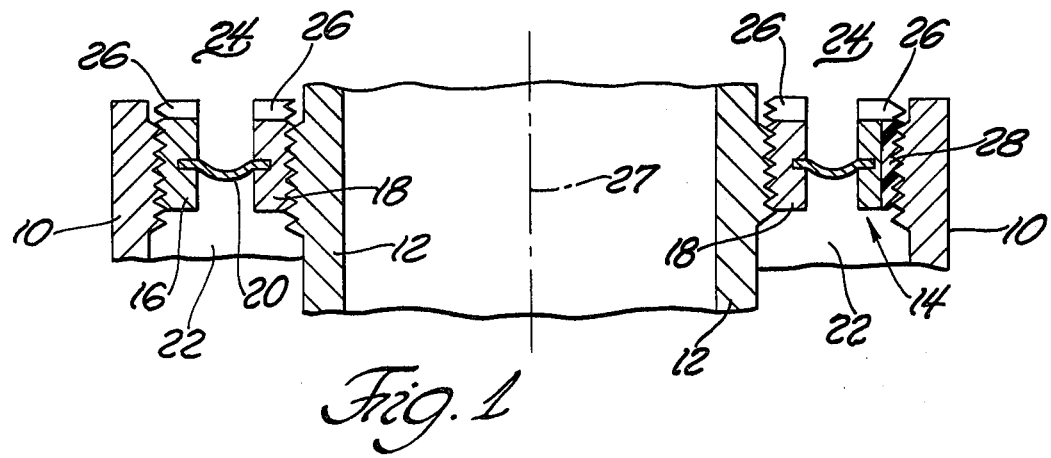
FIG. 1 is a sectional view through an assembly embodying my improved seal.

FIG. 1 illustrates an assembly that includes an outer hollow cylindrical member 10 and an inner cylindrical member 12. Members 10 and 12 are relatively immovable in a rotational sense, i.e. both are stationary or both are rotational so that neither rotates relative to the other. However, the inner member 12 can move a limited distance in the axial or radial directions, within the physical constraints imposed by my improved seal assembly 14. The seal assembly comprises an outer ring 16, an inner ring 18, and an intervening elastic or flexible membrane 20 affixed to both rings, as by heat bonding of the membrane material, adhesive, or mechanical crimping of the ring materials. Membrane 20 is preferably formed of a flexible material such as sheet rubber, impervious fabric, or thin flexible spring metal. Rings 16 and 18 can be formed of various materials, such as metal or plastic. The seal assembly is intended to prevent passage of liquid or gas from the annular space 22 below the seal assembly to the external space 24 above the seal assembly, or vice versa.

The complete installation can be of various types, e.g. a bearing wherein inner tube 12 acts as a bearing for a non-illustrated shaft or stem adapted to move rotationally or axially within tube 12. The installation must be of such nature that the seal assembly 14 is located at the mouth of member 10, i.e. at an end of member 10. This location is dictated by the fact that rings 16 and 18 are screwed onto members 10 and 12 by use of a spanner wrench; free space around member 10 is required to accommodate manual turning force on the wrench.

The seal assembly is installed in the space between members 10 and 12 by screwing the complete seal assembly onto threaded surfaces formed or machined on the inner surface of member 10 and the outer surface of member 12. Since membrane 20 has its edges affixed to rings 16 and 18 it is necessary that both rings be screwed onto members 10 and 12 simultaneously. For this purpose rings 16 and 18 are formed with slots 26 in their upper edge surfaces; the slots are sized to receive a turning implement such as a spanner wrench. Any number of slots can be formed in the rings 16 and 18 provided that a pair of slots at one point on the ring periphery is balanced by a corresponding pair of slots on the ring periphery on a diammetrical line passing through the turning axis 27. In lieu of slots it is possible to use holes or upstanding pins to form wrench-engagement surfaces.

Rings 16 and 18 are screwed onto members 10 and 12 simultaneously, but it is not necessary that the thread lead-in surfaces simultaneously enter into the threads on members 10 and 12. Either ring 16 or 18 can be slightly above or below the other ring since flexible membrane 20 will compensate for small ring height differences. However it is desirable, and probably necessary in most cases, that the pitch of the threads on members 10, 16, 18 and 12 be the same; otherwise rings 16 and 18 would tend to be excessively displaced from one another in the axial direction as the screw-in operation proceeded.

The threads preferably are comparatively tight fits on one another to preclude or minimize fluid flow around membrane 20. Additionally one or both rings 16 and 18 can be provided with resilient plastic inserts 28 deformable by engagement with threads on members 10 and 12 to form a barrier to fluid flow along the thread interfaces. If member 12 is formed of plastic or other relatively soft material it is possible to use ring 18 as a thread-forming device, i.e. to let the threads on ring 18 penetrate a linear surface on member 12 and thus cut the member 12 threads as part of the seal assembly installation procedure.

Figure 2:
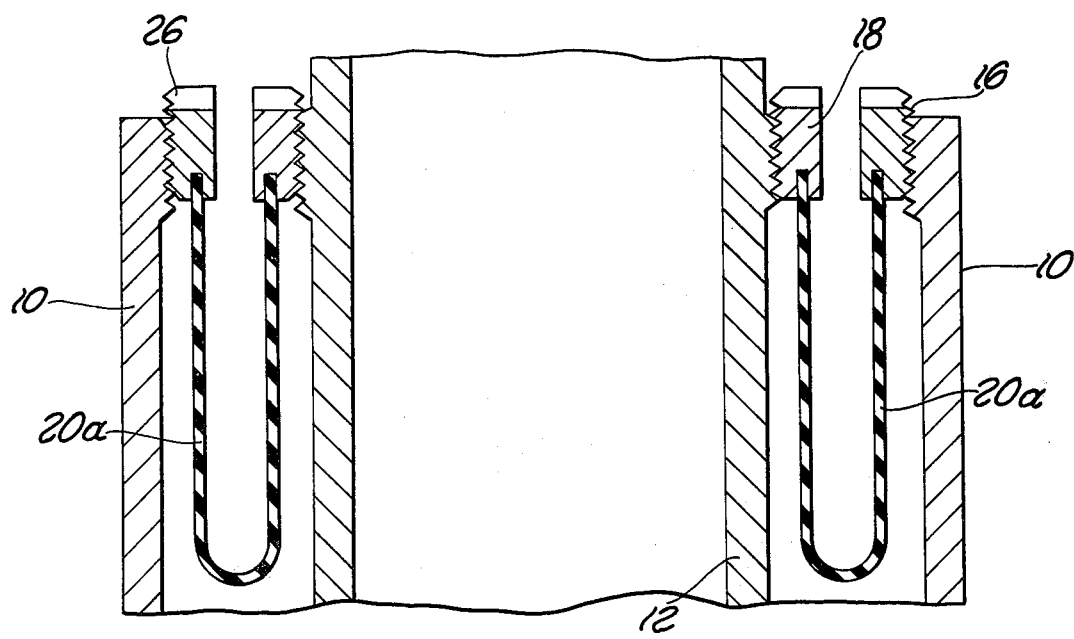
FIG. 2 is a sectional view illustrating another embodiment of my invention.

The arrangement of FIG. 1 contemplates that member 12 will have little or no axial motion. FIG. 2 illustrates an arrangement that is generally similar to FIG. 1 except that the flexible membrane 20a takes the form of a bellofram element that allows member 12 to move axially for an extended distance.

The illustrated arrangements are advantageous in that the flexibility of the sealing membrane permits considerable play or adjustment of member 12, both radially and axially; precise location of member 12 is not required to accommodate the seal assembly. The one-step method of installing or removing the seal assembly is indirectly beneficial in that it allows some simplification of the seal assembly, especially as regards the number of component parts in the assembly. Membrane 20 or 20a can be factory-affixed to rings 16 and 18 without additional intervening fastener devices that would otherwise be required if one or more of the mounting rings were assembled to member 10 or 12 as a separate functional step apart from installation of the membrane. The reduced number of components in the seal assembly is advantageous as regards reduced parts costs and also as regards reduction in space required to accommodate the seal assembly between members 10 and 12.

I wish it to be understood that I do not desire to be limited to the exact details of construction shown and described for obvious modifications will occur to a person skilled in the art.

I claim:

1. In the combination comprising a first hollow cylindrical member having a relatively large inner diameter, and a second cylindrical member having a relatively small outer diameter; said second member being disposed within the first member: the improvement comprising an improved sealing assembly for the annular joint between the two members; said sealing assembly comprising first screw threads formed on the inner surface of the outer member, and second screw threads formed on the outer surface of the inner member; a first annular ring having threads on its outer surface for meshed engagement with the first screw threads, a second annular ring having threads on its inner surface for meshed engagement with the second screw threads; and an annular flexible membrane having its outer and inner edges permanently affixed respectively to the first and second rings; the pitch of the first and second screw threads being the same; the first and second rings having their thread lead-in surfaces arranged so that the rings can be simultaneously screwed onto the threads on the outer and inner cylindrical members; both of said rings having wrench-engagement indentations in their corresponding end faces for simultaneous interaction with a turning implement, whereby the rings are turned together through similar angular distances during installation or removal of the sealing assembly to or from the defined annular joint; the inner diameter of the first ring being substantially greater than the outer diameter of the second ring, whereby the second cylindrical member can have substantial radial play within the first cylindrical member; said first and second screw threads being formed on radially-aligned areas of the cylindrical members whereby the first and second rings are in substantial radial alignment with one another, to thus minimize axial space required to mount the sealing assembly.

* * * * *